(12) United States Patent
Goel et al.

(10) Patent No.: US 12,063,157 B2
(45) Date of Patent: Aug. 13, 2024

(54) TRANSMITTING MULTI-DIMENSIONAL DATA BETWEEN DEVICES

(71) Applicant: Microsoft Technology Licensing, LLC, Redmond, WA (US)

(72) Inventors: Deepak Goel, San Jose, CA (US); Ruihua Peng, San Jose, CA (US); Xiaoling Xu, Cupertino, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 41 days.

(21) Appl. No.: 17/341,135

(22) Filed: Jun. 7, 2021

(65) Prior Publication Data
US 2022/0393975 A1 Dec. 8, 2022

(51) Int. Cl.
*G06F 3/06* (2006.01)
*H04L 45/00* (2022.01)
*H04L 45/42* (2022.01)
*H04L 45/745* (2022.01)

(52) U.S. Cl.
CPC ......... *H04L 45/566* (2013.01); *G06F 3/0604* (2013.01); *G06F 3/064* (2013.01); *G06F 3/067* (2013.01); *H04L 45/42* (2013.01); *H04L 45/745* (2013.01)

(58) Field of Classification Search
None
See application file for complete search history.

(56) References Cited

U.S. PATENT DOCUMENTS

| | | |
|---|---|---|
| 6,697,996 B2 | 2/2004 | Chethik |
| 8,392,579 B2 | 3/2013 | Walls et al. |
| 8,706,832 B2 | 4/2014 | Blocksome |

(Continued)

FOREIGN PATENT DOCUMENTS

WO WO-2017014809 A1 * 1/2017

OTHER PUBLICATIONS

"Lossless Communication with Network Streams: Components, Architecture, and Performance", In White Paper, Dec. 8, 2019, 44 Pages.

(Continued)

*Primary Examiner* — Chris Parry
*Assistant Examiner* — Abderrahmen Chouat
(74) *Attorney, Agent, or Firm* — Ray, Quinney & Nebeker; James S. Bullough

(57) ABSTRACT

The present disclosure relates to systems, methods, and computer-readable media for data from a first multi-dimensional memory block to a second multi-dimensional memory block. For example, systems described herein facilitate transferring data between memory blocks having different shapes from one another. The systems described herein facilitate transferring data between different shaped memory blocks by identifying shape properties and other characteristics of the data and generating a plurality of network packets having control data based on the identified shape properties and other characteristics. This data included within the network packets enables memory controllers to determine memory addresses on a destination memory block to write data from the network packets. Features described herein facilitate efficient transfer of data without generating a linearized copy that relies on constant availability of significant memory resources.

20 Claims, 9 Drawing Sheets

(56) References Cited

U.S. PATENT DOCUMENTS

| | | | |
|---|---|---|---|
| 8,713,285 B2 | 4/2014 | Rakib et al. | |
| 9,396,586 B2 | 7/2016 | Bell et al. | |
| 10,025,591 B2 | 7/2018 | Plotnikov et al. | |
| 10,084,572 B2 | 9/2018 | Schoppmeier et al. | |
| 10,332,302 B2 | 6/2019 | Vembu et al. | |
| 10,509,764 B1* | 12/2019 | Izenberg | G06F 16/22 |
| 11,422,715 B1* | 8/2022 | Walton | G06F 3/0673 |
| 2005/0243866 A1* | 11/2005 | Koguchi | H04L 12/40084 |
| | | | 370/465 |
| 2006/0280174 A1* | 12/2006 | Villefrance | H04L 9/40 |
| | | | 370/469 |
| 2013/0311612 A1* | 11/2013 | Dickinson | H04L 67/02 |
| | | | 709/219 |
| 2019/0129655 A1* | 5/2019 | Lee | G11C 16/10 |
| 2020/0019535 A1* | 1/2020 | Parker | G06F 16/176 |
| 2020/0136986 A1* | 4/2020 | Southworth | H04L 49/901 |
| 2020/0249973 A1* | 8/2020 | Ramesh | G06F 3/0664 |
| 2020/0344298 A1 | 10/2020 | Iyer et al. | |
| 2020/0371978 A1 | 11/2020 | Simpson et al. | |
| 2021/0373895 A1* | 12/2021 | Shahim | G06F 3/0679 |
| 2022/0236908 A1* | 7/2022 | Lu | G06F 3/0655 |
| 2022/0253245 A1* | 8/2022 | Seo | G06F 3/064 |

OTHER PUBLICATIONS

"International Search Report and Written Opinion Issued in PCT Application No. PCT/US22/028665", Mailed Date: Sep. 23, 2022, 12 Pages.

* cited by examiner

TRANSMITTING MULTI-DIMENSIONAL DATA BETWEEN DEVICES

BACKGROUND

Recent years have seen a rise in the use of computing devices (e.g., mobile devices, personal computers, server devices, cloud computing systems) to receive, store, edit, transmit, or otherwise utilize digital data. For example, it is now common for computing devices to communicate large digital files over wired and wireless communication networks for a variety of applications. As digital content increases in complexity and size, demand for transmitting large quantities of data between devices and hardware at faster speeds and in a reliable manner has also increased.

Many computing devices maintain data within multi-dimensional blocks (e.g., memory blocks). Transmitting data from these memory blocks between hardware units presents a number of difficulties and complications. For example, where a destination hardware does not necessarily include a similar size or shape of hardware as a source hardware, conventional techniques for transferring the data between devices presents a challenge in ensuring reliability and accessibility. Moreover, where conventional data transfer systems may linearize data prior to transmission, this often involves copying entire blocks of data and may cause problems in computing environments where memory resources are limited.

These and other problems exist in connection with transmitting multi-dimensional data between devices and other electrical hardware.

DETAILED DESCRIPTION

Figure 1:
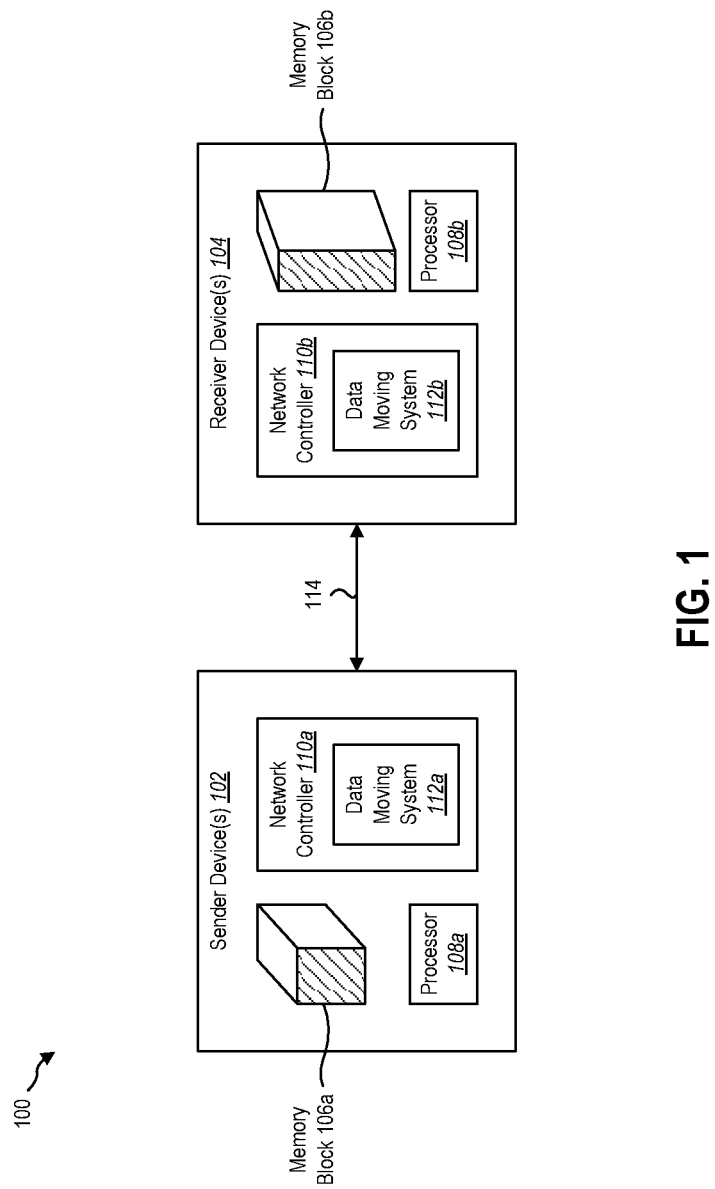
FIG. 1 illustrates an example environment of a sender device transmitting a multi-dimensional block of data to a receiver device in accordance with one or more embodiments.

The present disclosure is generally related to facilitating transfer of multi-dimensional data between a sender device and a receiver device. In particular, this disclosure describes features and functionality implemented by network controllers on respective devices to facilitate transfer of data from a first multi-dimensional block of memory having a first shape to occupy a second multi-dimensional block of memory having a second shape. For example, network controllers can identify shape properties for multi-dimensional memory blocks. The network controllers may further generate network packets having fields that identify the shape properties that enable the respective devices to efficiently determine memory addresses on a receiver device when transmitting the network packets from the sender device to the receiver device.

As an illustrative example, this disclosure describes a network controller that identifies a set of data characteristics (e.g., shape properties) for data stored or otherwise maintained on a first multi-dimensional block on a sender device. The network controller may additionally receive a message from a receiver device (e.g., from a network controller of the receiver device) that includes shape properties and other characteristics of a second multi-dimensional memory block on the receiver device. The network controller may further generate network packets for transmitting data from the sender device to the receiver device where the network packets each include information based on the respective shape properties that enables the network controller(s) to write data from the first memory block having the first shape to the second memory block having the second shape.

The present disclosure includes a number of practical applications that provide benefits and/or solve problems associated with transmitting data between a first memory block on a sender device and a second memory block on a receiver device where the memory blocks have different shape properties. Examples of some of these applications and benefits are discussed in further detail below.

For example, by collecting shape data from both a sender and receiver memory block, network controllers can translate memory addresses from a first memory block to a corresponding memory address for a second memory block. For instance, a first memory controller on a sender device can identify data characteristics including a base memory address, a size of a memory block, and various shape properties (e.g., array dimensions). The memory controller may further receive a message from a second memory controller including one or more data characteristics associated with a memory block on a receiver device on which data from the first memory block will be written.

As another example, by generating network packets that each include fields of a header(s) having values based on determined shape properties, the network controllers may facilitate transmission of data more quickly and efficiently between the sender and receiver devices. Packetizing the data in this way further enables the devices to transmit the data as quickly as a connection allows without necessarily transmitting the data from the packets in a specific order.

In addition to generally transmitting data faster, features and functionalities of the network controllers described herein facilitate transferring data without making a copy of all the data from the memory block prior to transmitting between the respective devices. For example, where many conventional systems generate a linearized copy of data prior to transmitting from a first to a second device, one or more embodiments described herein involve simply generating and transmitting network packets including data and associated data characteristics. Nevertheless, while creating a linearized reproduction of data prior to transmitting can be an effective way keep data intact while transmitting the data between devices, this can cause problems or slow down the transmission process where a large amount of data is being transmitted and/or where memory is limited on one or both of the respective devices. For example, linearizing the data prior to transmission can present challenges where one or both of the devices do not have sufficient buffer memory to store a copy of linearized data.

Moreover, by transferring data in accordance with one or more embodiments described herein, effective communication of data between devices is enabled using smaller hardware units for network controllers and associated components on the respective devices. For example, by generating and transmitting network packets rather than generating a linearized copy of data, the network controllers may be implemented on smaller hardware components that consume less power. This enables computing systems to provide greater bandwidth in communicating data between devices. This greater bandwidth provides additional utility in a variety of computing environments, particularly in applications that involve artificial intelligence (AI) training and other machine learning workloads.

As illustrated in the foregoing discussion, the present disclosure utilizes a variety of terms to describe features and advantages of the systems herein. Additional detail is now provided regarding the meaning of some example terms.

For example, as used herein, a "multi-dimensional memory block" (or simply "memory block") may refer to any unit of memory or data stored or otherwise maintained on a computing device. A memory block may refer to some quantity of data (e.g., memory) that is accessible to a processor, memory controller, network controller, or any other component(s) of an associated computing device. In one or more embodiments described herein, a memory block refers to a multi-dimensional array configured to store data thereon. A memory block may have a corresponding shape and may be associated with a number of data characteristics (discussed below). For example, a memory block may refer to one or multiple segments of memory or specific portions of memory stored or otherwise maintained within a two-dimensional or three-dimensional array of memory hardware.

As used herein, a memory block may refer interchangeably to hardware on which data can be stored as well as the data that is stored (or to be stored) on memory hardware. For example, a memory block may refer to an empty array of memory cells on which no data is stored, but is configured to have a block of data written thereon (e.g., by a processor and/or network controller). As another example, a memory block may refer to an occupied portion of memory hardware, and may refer to one or both of the hardware as well as the data stored thereon.

As will be discussed in further detail below, a memory block may be associated with data characteristics descriptive of data stored on the memory block. As used herein, "data characteristics" may refer to one or more properties of the data and/or memory hardware associated with the memory block. The data characteristics may include features descriptive of the data itself and/or a shape of the data on the memory block. For example, in one or more embodiments described herein, data characteristics for a memory block may include shape properties, such as array dimensions for a memory block, a memory address, a memory range, one or more offset values, and any other information that may be used to identify a shape and location of a memory block within memory hardware.

As will be discussed herein, data from a memory block may be included within and transmitted using a plurality of network packets. As used herein, a "network packet" may refer to a unit of data carried from a first device to a second device via a network connection. In one or more embodiments, a network packet includes control information and a payload. In one or more implementations described herein, the payload may refer to content of a memory block or portion of a memory block being transmitted between a sender device and a receiver device. The control information may include any additional information that enables a network controller and/or processor on an associated device to determine how data from the payload can be written to or read from a memory block. In one or more embodiments, the control data includes one or more of the data characteristics discussed above. The control data may additionally include information about the respective devices and any other information included within one or more headers of the network packet in addition to the payload.

Additional detail will now be provided regarding examples of various systems and devices in relation to illustrative figures portraying example implementations. For example, FIG. 1 illustrates an example environment 100 including a sender device(s) 102 and a receiver device(s) 104 configured to transmit data from one device to the other in accordance with one or more embodiments described herein. Each of the devices 102, 104 may include multi-dimensional memory blocks 106a-b, processors 108a-b, and network controllers 110a-b. As further shown, each of the network controllers 110a-b may include data moving systems 112a-b (e.g., data moving accelerators (DMAs)) implemented thereon. It will be understood that features and functionalities described in connection with one or more of the components 106-112 on either the sender device 102 or receiver device 104 may apply to a corresponding similar component on the other device(s).

As further shown in FIG. 1, data can be transmitted between the sender device 102 and the receiver device 104 via a wired connection 114. In one or more embodiments, the wired connection 114 refers to an Ethernet wire connecting network controllers 110a-b of the respective devices. Other types of wires capable of transmitting network packets between devices and chips may similarly be used.

While FIG. 1 illustrates an environment 100 including a first device 102 and a second device 104, it will be understood features and functionalities described herein may apply to other more complex environments that include any number of computing devices capable of communicating with one another. In addition, features described herein may refer to chips or hardware within individual devices capable of transmitting data between respective memory components. By way of example, the environment 100 illustrated in FIG. 1 may be implemented within a cloud computing system, a local network, or other network of devices within which devices are connected (e.g., wired or wirelessly) and where data may be transmitted between respective devices using network packages. In one or more embodiments described herein, the sender and receiver devices 102, 104 are implemented as part of a machine learning accelerator system in which large blocks of data are shared between respective devices over a wired and/or wireless communication network.

As a brief summary, and as will be discussed in further detail below, a sender device 102 may receive a command or otherwise determine to transmit data from a first memory block 106a from the sender device 102 to a receiver device 104. In this example, the sender device 102 may receive instructions to transmit data from a first multi-dimensional memory block 106a to a receiver device 104 to be written to a second multi-dimensional memory block 106b having a different shape than the first multi-dimensional memory block 106a. In this example, the memory blocks 106a-b have three dimensions. Other implementations may include memory blocks having two dimensions. In one or more embodiments, the memory blocks may include a combination of two and/or three dimensions.

As shown in FIG. 1, each of the sender device 102 and receiver device 104 includes a corresponding network controller. In one or more embodiments, the network controllers 110a-b may collect and maintain information about respective memory blocks 106a-b and implement instructions associated with managing data thereon and/or transmitting data from one memory block to another. Indeed, one or more methods and implementations described herein may be performed by one or both of the memory controllers 110a-b on the respective devices 102-104. While one or more embodiments described herein refer to discrete acts performed by the sender device 102 and the receiver device 104, it will be understood that features and functionalities described in connection with the sender device 102 and receiver device 104 may similarly apply to one another. For example, while the sender device 102 may perform a series of acts related to generating and transmitting network packets to the receiver device 104, in one or more embodiments, the receiver device 104 may function as a sending device for another device (e.g., the sender device 102) within the environment 100.

As shown in FIG. 1, the network controllers 110a-b may include data moving systems 112a-b. In one or more embodiments described herein, a first data moving system 112a (e.g., a first data moving accelerator (DMA)) may provide functionality related to creating or otherwise generating network packets. For example, the first data moving system 112a can generate network packets by inserting control information within a header that precedes a payload. The data moving system 112a may also divide the data from a memory block across multiple payloads from respective network packets and insert control information that enables the payload data to be reconstructed on a receiver device 104.

On the receiver device 104, a second data moving system 112b (e.g., a second DMA) can provide functionality related to receiving and interpreting network packets. For example, the second data moving system 112b can read the control information and determine a location within a corresponding memory block to write the data from the payload. For example, as will be discussed in further detail below, the second data moving system 112b can calculate a memory address for each of the received network packets based on information (e.g., data characteristics) from the packet header inserted within the network packets by the first data moving system 112a.

Figure 2:
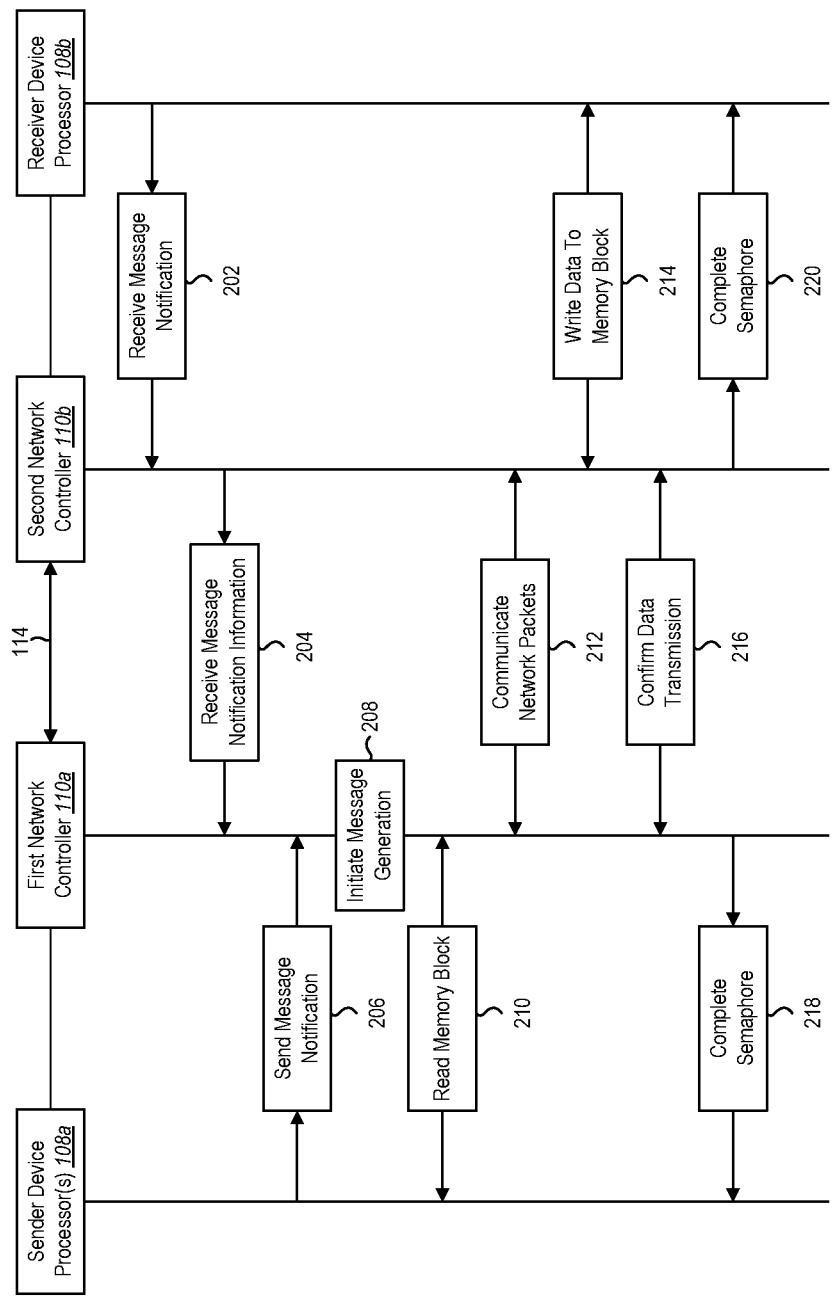
FIG. 2 illustrates an example implementation in which network controllers of respective devices implement transfer of a multi-dimensional block of data between the devices in accordance with one or more embodiments.

Additional information in connection with the respective components of the sender device 102 and receiver device 104 will now be discussed in connection with an example implementation illustrated in FIG. 2. In particular, FIG. 2 illustrates an example implementation showing a first processor 108a and a first network controller 110a on the sender device in communication with one another and in communication with a second processor 108b and second network controller 110b on the receiver device. It will be understood that FIG. 2 illustrates a series of acts performed by the respective devices 102, 104 in a particular order in accordance with one or more embodiments. Other implementations may involve omitting one or more of the acts shown in FIG. 2 or performing one or more of the acts shown in FIG. 2 in a different order.

As shown in FIG. 2, a receiver device processor 108b (or simply "processor 108b") can perform an act 202 of providing a receive message notification to the second network controller 110b on the receiver device 104. The receive message notification may include various data characteristics for a second memory block 106b on the receiver device. For example, this may include information about ranges of memory addresses that are vacant or otherwise available for writing data thereon. In one or more embodiments, the receive message notification includes shape properties of a memory block 106b on the receiver device 104. For example, the receive message notification may include destination memory addresses, a receive buffer size, and a receive complete semaphore (described in further detail below). The receive message notification may further include dimension properties for the second memory block 106b.

As shown in FIG. 2, the second network controller 110b can perform an act 204 of providing receive message notification information to the first network controller 110a. As indicated above, this information may include various data characteristics for a memory block on the receiver device. For example, the second network controller 110b can provide information including shape properties of a memory block on the receiver device, which may include information such as a destination memory address, a receiver bugger size, and a receive complete semaphore. Indeed, the receive message notification information may include any information that may be used in preparing instructions for calculating memory addresses on a second memory block. Additional information in connection with a receive message notification is discussed below in connection with FIG. 4B.

As shown in FIG. 2, the sender device processor(s) 108a (or simply "processor 108a") can perform an act 206 of generating and providing a send message notification to the first network controller 110a. Similar to the receive message notification, the send message notification may include various data characteristics for a first memory block 106a on the sender device 102. These characteristics may include source memory address(es), a size of a block of data, a send complete semaphore, and any other information descriptive of a size or shape of the data within a first memory block 106a. As will be discussed in further detail below, these characteristics may be used in generating network packets for transmitting to the receiver device 104.

After receiving the send message notification and the receive message notification information, the first network controller 110a can perform an act 208 of initiating message generation. For example, as will be discussed in further detail below, the first network controller 110a may initiate segmentation of a message including data from the first memory block 106a to be transmitted to a receiver device 104 and stored on a second memory block 106b. In one or more embodiments, this involves determining a size of packet segments and/or a number of network packets. In one or more embodiments, the first network controller 110a determines whether to break up a message into multiple message blocks (e.g., based on a maximum size of message that the sender device 102 is configured to send or that the receiver device 104 is configured to receive). In one or more embodiments, the network controllers 110a-b determine to break a message into multiple message blocks based on identifying or otherwise determining that the message will be transmitted over multiple network interfaces.

In one or more embodiments, the first network controller 110a initiates generation of the message(s) by performing an act 210 of reading data from the memory block 106a. For example, the first network controller 110a can read data segments corresponding to a determined size (e.g., a predetermined size) of the network packets to be transmitted to the second device 104. In one or more embodiments, the packet sizes (e.g., a segmentation size of the packets) may be a variable size block having a predetermined size of kilobyte (KB) units for each of the generated network packets. By way of example, the network packet sizes may be 2 KB, 4 KB, 8 KB, 16 KB, 64 KB or any other standard packet size. The size of the packets (e.g., segmented packets) may be determined based on specifications of hardware on the respective devices 102, 104. In any of the above examples, each of the segment sizes for a multi-block data message may have the same segment size for each of the packets that make up the message (with a last network packet size possibly being smaller than a first set of packets).

In addition to reading the data from the memory block 106a and generating payloads of the network packets, the first network controller 110a can additionally generate control data to include within the network packets that may be used in converting data from the first memory block 106a to placement within the second memory block 106b. In particular, as mentioned above, and as will be discussed in further detail below, the first network controller 110a can generate packet headers based on data characteristics of the memory blocks 106a-b, and specifically based on one or more shape properties for the memory blocks 106a-b.

As just mentioned, and as will be discussed in further detail below in connection with FIGS. 3-4C, each of the packet headers may include data characteristics including shape properties. This control information may enable the second network controller 110b to receive a network packet and populate a specific portion of the second memory block 106b with data from the packet payload. For example, in one or more embodiments, each of the network packets includes base addresses of the first and/or second memory blocks 106a-b indicating an initial memory address within the memory block(s). In addition, each of the network packets may include shape data indicating dimensions within which content from the network packet should be written. The network packets may also include size data indicating a size of one or more messages that are being sent via the network packets.

In addition to size and shape data, the network packets may further include one or more offset values. In particular, each of the network packets may include an offset value indicating an offset multiple from the base address. As used herein, a base address may refer to a location on memory hardware associated with a range of memory for a corresponding memory block. For example, a base address may refer to a first address in a range of memory addresses that a memory block occupies on a memory system. The base address may serve as a reference point for other memory locations within the memory hardware. For example, finding a specific address (e.g., an absolute address) for data stored in a block of memory may be found based on a base address and a corresponding offset value based on a distance from the base address.

As noted above, where the network packets have a fixed or uniform size (e.g., 2 KB, 4 KB, 8 KB), the offset value can provide an indication of a range of bytes or range of addresses from the base address that content from the network packet should be written to. Thus, as discussed above, in one or more implementations, a multi-packet message may include a first set of network packets having a fixed segmentation size to segment a variable size block with a last network packet size being smaller than the size of the first set of network packets.

This offset value, in combination with shape properties, the base address, and additional information included within the network packet header(s), enables the first network controller 110a and second network controller 110b to calculate a location within the respective memory blocks 106a that a content portion (e.g., the payload) of the network packet should be written to. This further enables data from a first memory block 106a of a first shape to be applied to a second memory block 106b of a second (different) shape. Moreover, this enables the memory controllers 110a-b to effectively determine where on a memory block content from an individual payload applies, which enables transmission of multiple network packets without adhering to a strict order of transmission as well as preventing the network controllers 110a-b from generating a linear copy of the data prior to transmitting.

As shown in FIG. 2, the first network controllers 110a-b may perform an act 212 of communicating network packets between the sender device 102 and the receiver device 104. As noted above, this transmission may occur over an Ethernet wire between the first network controller 110a and the second network controller 110b. Other wired and/or wireless connections may similarly be used. As noted above, in one or more embodiments, the network packets are provided in any order between the respective devices 102, 104.

As further shown in FIG. 2, upon receiving the network packets, a second network controller 110b can perform an act 214 of writing data to a second memory block 106b on the receiver device. For example, as discussed above, the second network controller 110b can receive each network packet and calculate or otherwise determine a corresponding location within the second memory block 106b that data from the network packet should apply. In one or more embodiments, the second network controller 110b determines a range of memory addresses for each of the network packets based on base address information, an indicated offset, and shape data included within the network packet. For example, where each network packet includes a base address, an offset value, destination shape properties, and the data, the second network controller 110b may easily determine a range of memory addresses within which to write the data from the specific network packet.

In one or more embodiments, the second network controller 110b may initiate writing data to the second memory block 106b prior to receiving all of the network packets from the first network controller 110a. Indeed, because each of the network packets may include control information that enables the network packet to be individually assigned to a corresponding range of memory addresses, the second network controller 110b may begin writing data to the memory block 106b as soon as network packets begin to arrive. Moreover, because the network packets each include control information that enables the second network controller 110b to determine the specific range of memory address within the disparate shape of the second memory block 106b, the second network controller 110b can write the data from the individual payloads even where the network packets are received out of order from one another.

As shown in FIG. 2, in one or more embodiments, the first network controller 110a and second network controller 110b can perform an act 216 of confirming data transmission between the respective devices. For example, in one or more embodiments, the second network controller 110b provides configuration of each network packet. In one or more embodiments, a plurality of network packets is followed by a final network packet for a corresponding message that indicates an end of a set of network packets. Where a set of packets represents a single message being transmitted from the sender device 102 to the receiver device 104, this may involve the first network controller 110a sending a single message complete notification. Alternatively, where a plurality of network packets includes multiple message blocks, the first network controller 110a may provide a message complete notification for each of the respective message blocks.

As shown in FIG. 2, the first network controller 110a may perform an act 218 of generating and providing a complete semaphore to the first processor 108a. Similarly, the second network controller 110b may perform an act 220 of generating and providing a complete semaphore to the second processor 108b. In one or more embodiments, the network controllers 110a-b send the complete semaphore packets without waiting for acknowledgement or confirmation of the data transmission. These semaphore packets may be used by the respective devices to control access to the data stored within the respective memory blocks 106a-b. In one or more embodiments, these semaphores may be provided to other devices within a network of devices to facilitate sharing of data between the respective devices, including devices having memory blocks of disparate shapes and dimensions.

As mentioned above, the network controllers 110a-b may generate a plurality of network packets for transmitting between a sender device 102 and receiver device 104. FIG. 3 illustrates an example implementation in which a network controller (e.g., a first network controller 110a) generates and transmits a message having two message blocks. In accordance with one or more embodiments described herein, the message may refer to a set of data from a first memory block on a sender device being transmitted to a receiver device to be stored on a second memory block having a different shape than the first memory block.

Figure 3:
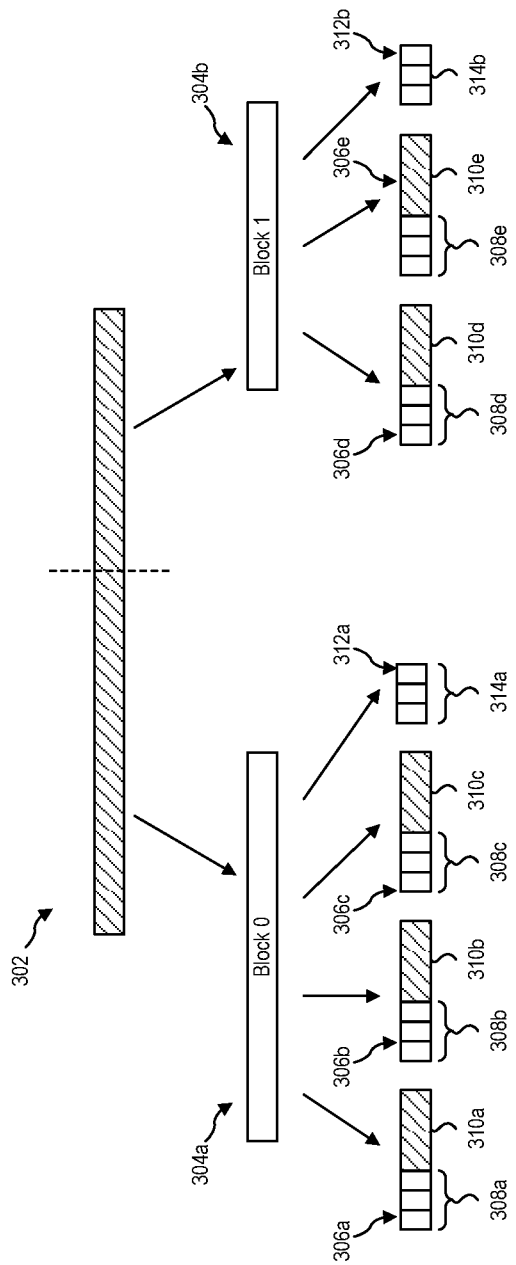
FIG. 3 illustrates an example set of data packets generated for transferring data between a sender device and a receiver device in accordance with one or more embodiments.

In particular, FIG. 3 shows a data message 302 having a first message block 304a and a second message block 304b. In one or more embodiments, the network controller(s) segments the message 302 up into the first and second message blocks 304a-b based on hardware specifications limiting a size of individual message blocks. For example, where hardware of a network controller supports a maximum message size of 64 megabytes (MBs) (or other message size), transmitting a message having larger than 64 MBs may involve generating multiple message blocks. Larger messages may be divided into a greater number of message blocks.

As shown in FIG. 3, each of the message blocks may include a corresponding set of network packets. For example, a first message block 304a may include a first set of network packets 306a-c. Similarly, a second message block 304b may include a second set of network packets 306d-e. The first set of network packets 306a-c may have a combined size equal to or less than a maximum message size that hardware of a network controller is configured to transmit. As a result, in this example, the first message block 304a may include a higher number of network packets than the second message block 304b.

As shown in FIG. 3, each of the network packets 306a-e may include a number of packet fields. For example, each of the network packets 306a-e may include a set of header fields 308a-e. The header fields 308a-e may include a variety of information relevant to transmitting messages between respective devices. For example, a first set of header fields 308a may include an Ethernet header, an IP header (e.g., an IPv4 header), and a user datagram protocol (UDP) header. The set of header fields 308a may additionally include one or more headers including transport layer information, network layer information, and any additional information that facilitates secure communication of associated data between the sender and receiver devices.

In one or more embodiments, the header fields 308a additionally include a message header, which may include any of the data discussed above in connection with the plurality of network packets. For example, in one or more embodiments, the header fields 308a includes a memory address, an offset value, an indicated size of the message block 304a, shape properties, and any other information that enables a network controller on a receiver device to calculate a range of memory addresses on a destination memory block. Each of the additional header fields 308b-e may include similar information as the first header field 308a. Indeed, in one or more embodiments, each of the header fields 308a-e has a uniform format in which predefined bits of the header fields 308a-e represent corresponding values for the corresponding message blocks 304a-b.

In this example, for instance, a first set of network packets 306a-c may include a first base address field and a corresponding set of offset values. For instance, the first header fields 308a may include a first base address and an offset value of zero. The second header fields 308b may include the first base address and an offset value of one. The third header fields 308c may include the first base address and an offset value of two. The network packets 306d-e of the second message block may pick up where the first message block left off or, alternatively, have a second base address and associated offset values. For instance, the fourth header fields 308d may include a second base address (or the first base address) and an offset field of zero (or another value corresponding to an offset from the first base address). Similarly, the fifth header fields 308e may include the second base address and an offset field of one.

It will be understood that the example implementation illustrated in FIG. 3 is provided by way of example and is not intended to be limiting to a specific embodiment. For example, the data message 302 may include additional or fewer message blocks. In addition, the respective message blocks 304a-b may include any number of network packets having a uniform format and payload size.

In addition to the header fields 308a-e, each of the network packets 306a-e may include corresponding payloads 310a-e containing content of the data message 302. In one or more embodiments, each of the payloads 310a-e have uniform sizes corresponding to respective segments of the data message 302. For example, in one or more embodiments, each of the payloads 310a-e refer to 2 KB, 4 KB, 8 KB, or other sized segments of digital content included within the respective network packets 306a-e. As discussed above, where each of the payloads 310a-e have a uniform size across the plurality of network packets 306a-e, a memory address for each of the payloads 310a-e may be calculated based on a base address, an offset value, shape properties, and any other information included within the associated header fields 308a-e.

As further shown in FIG. 3, each of the sets of network packets may have a corresponding complete notification packet 312a-b. For example, a first set of network packets 306a-c may be associated with a first complete notification packet 312a while a second set of network packets 306d-e is associated with a second complete notification packet 312b. Each of the complete notification packets 312a-b may signal the end of a respective message block. For example, the first complete notification packet 312a may signal the end of the first message block 304a while the second complete notification packet 312b signals the end of the second message block 304b.

Similar to the network packets 306*a-e*, each of the complete notification packets 312*a-b* may include a number of header fields 314*a-b*. The header fields 314*a-b* of the complete notification packets 312*a-c* may include similar data as included within the header fields 308*a-e* of the associated network packets 306*a-e*. In one or more embodiments, the complete notification packets 312*a-b* are an example of the remote semaphore messages that are provided to the respective processors on the sender and receiver devices.

As noted above, a variety of messages may be transmitted to and from the sender device 102 and the receiver device 104. Additional information in connection with examples of these messages is discussed in connection with FIGS. 4A-4C. In particular, FIGS. 4A-4C illustrate example implementations of a send message notification generated by a first network controller 110*a*, a receive message notification generated by a second network controller 110*b*, and remote semaphores discussed above in connection with one or more embodiments.

Figure 4A:
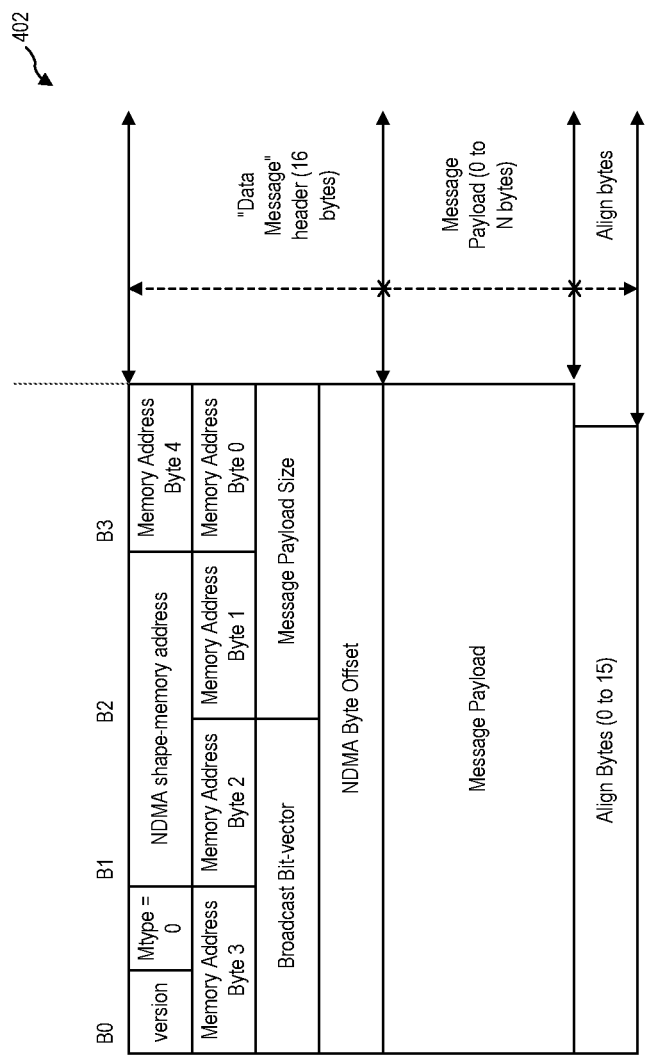
FIGS. 4A-4C illustrate example implementations of messages communicated by network controllers to initiate transfer of a multi-dimensional block of data between devices in accordance with one or more embodiments.

For example, FIG. 4A illustrates an implementation of an example send message notification 402 in accordance with one or more embodiments described herein. As shown in FIG. 4A, the send message notification 402 includes a data message header. The data message header may include a message type indicator and an indicator of a message address (e.g., a base address). In one or more embodiments, the data message header includes an identification of one or more shape properties (e.g., for a first memory block). As further shown, the data message header may include a broadcast bit-vector, a message payload size, and an offset value (e.g., a network DMA (MDMA) byte offset). In one or more embodiments, the data message header has a standard format having sixteen bytes as shown in FIG. 4A. As further shown in FIG. 4A, the send message notification may include a message payload, which may include any number of bytes. In one or more embodiments, the send message notification includes align bytes including zero to fifteen bytes.

Figure 4B:
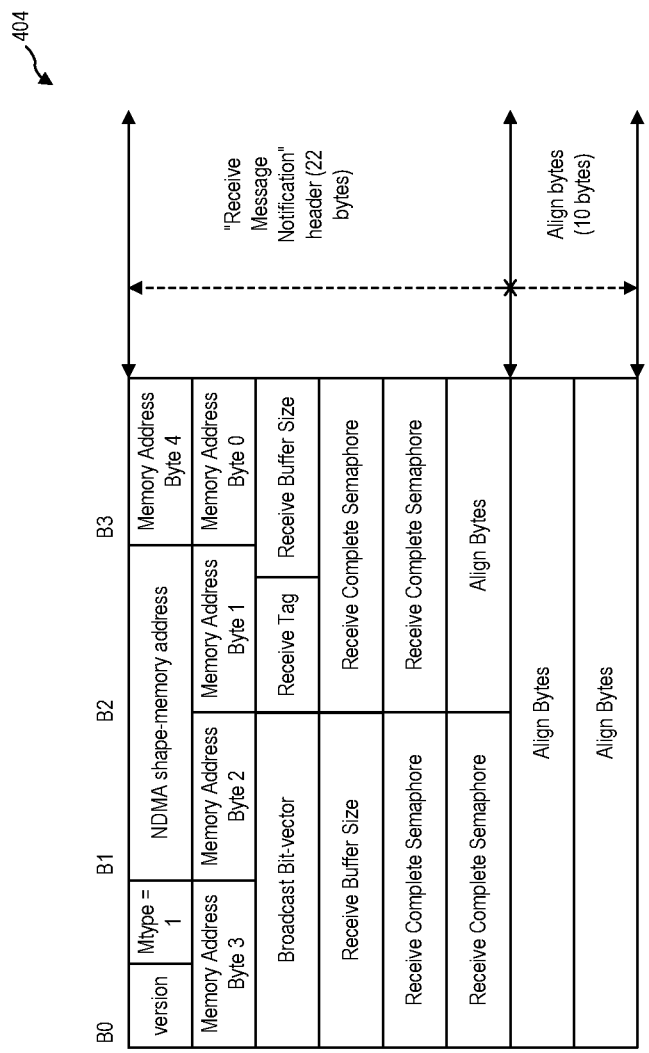

FIG. 4B illustrates an example implementation of an example receive message notification 404 in accordance with one or more embodiments described herein. As shown in FIG. 4B, the receive message notification 404 may include a receive message notification header. The receive message notification header may include a message type indicator and an indication of one or more shape properties (e.g., for a second memory block). The receive message notification header may include additional fields and corresponding values including, by way of example, a broadcast bit-vector, a receive tag, a receive buffer size, and receive complete semaphore(s). The receive message notification header may additionally include one or more align bytes. In one or more embodiments, the receive message notification 404 includes additional align bytes appended to the end of the receive message notification header.

Figure 4C:
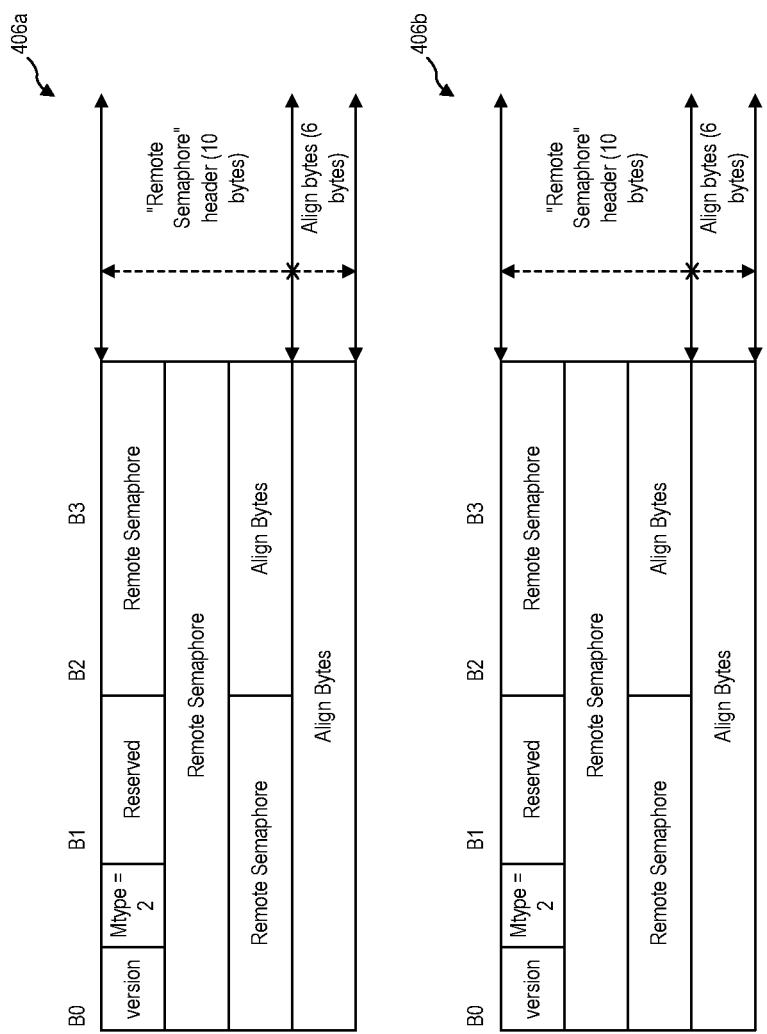

FIG. 4C illustrates example remote semaphores 406*a-b* in accordance with one or more embodiments described herein. For example, a first remote semaphore 406*a* may include a remote semaphore header. The remote semaphore header may include a message type indicator, a set of reserved bytes, and remote semaphores. In one or more embodiments, the remote semaphore header includes one or more align bytes. As shown in FIG. 4C, the first remote semaphore 406*a* may include a set of align bytes appended to the end of the remote semaphore header. In one or more embodiments, the first remote semaphore 406*a* is an example remote semaphore that the first network controller 110*a* provides to a first processor 108*a* upon transmitting a message to a receiver device 104.

FIG. 4C additionally illustrates a second remote semaphore 406*b*. The second remote semaphore 406*b* may include similar features as the first remote semaphore 406*a*. For example, the second remote semaphore 406*b* may include a remote semaphore header. The remote semaphore header may include a message type indicator, a set of reserved bytes, and remote semaphores. The remote semaphore header may also include one or more align bytes. As shown in FIG. 4C, the second remote semaphore 406*b* may include a set of align bytes appended to the end of the remote semaphore header. In one or more embodiments, the second remote semaphore 406*b* is an example remote semaphore that the second network controller 110*b* provides to a second processor 108*b* upon receiving the message from the sender device. 102.

Figure 5:
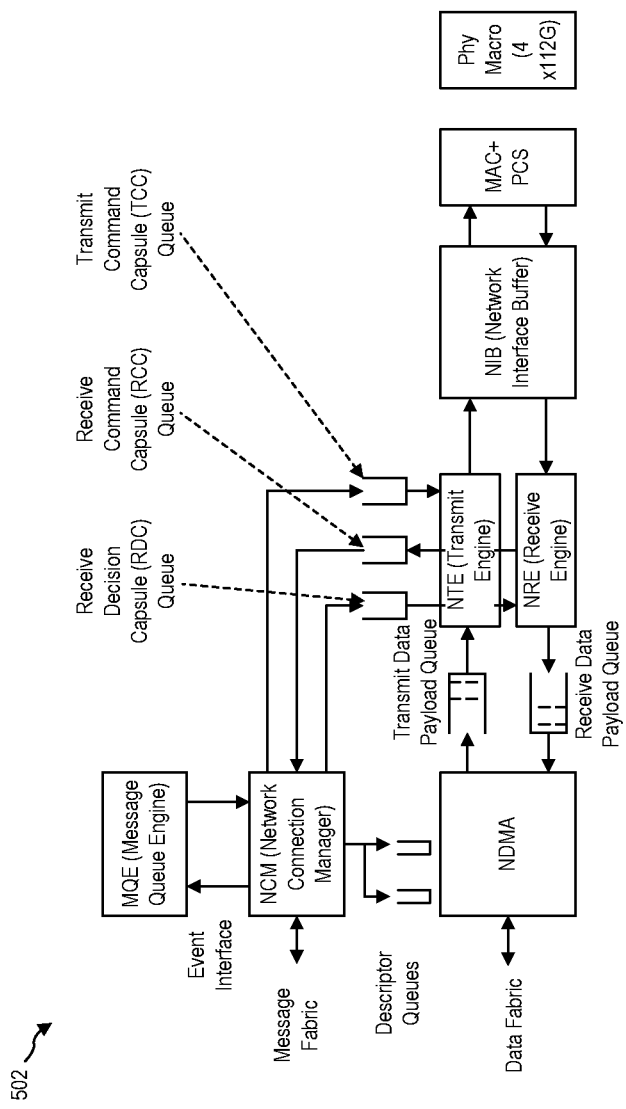
FIG. 5 illustrates an example block diagram showing an example implementation of a network controller in accordance with one or more embodiments.

As noted above, one or both of the sender device 102 and receiver device 104 may include a network controller that provides many of the features and functionalities described herein in connection with exchanging messages between the devices 102-104 as well as generating and transmitting network packets via a wire between the sender device 102 and the receiver device 104. FIG. 5 provides additional detail about an example network controller 502 configured to perform many of the acts described herein. In particular, FIG. 5 illustrates an example network controller 502 that may refer to an example of the network controllers 110*a-b* described above in connection with various embodiments.

As shown in FIG. 5, the network controller 502 may include a message queue engine. In one or more embodiments, the message queue engine implements notification queues (e.g., three queues) per connection. For example, a local data notification queue may store contends from a send message notification. A local no-data notification queue may store contents of a send remote semaphore notification. A remote notification queue may store contents from a remote message notification packet.

As further shown, the network controller 502 may include a network connection manager (NCM). In one or more embodiments, a message queue triplet (as discussed above) may connect to an endpoint connection. The network connection manager may keep state of endpoint connection and transit connection. The network connection manager may additionally implement state machines per connection, schedulers across connections, different rate limiters per connection, and a segmentation state machine. In one or more embodiments, the network connection manager interfaces with message fabric. For example, the network connection manager may receive the notification, decode the message, and add it to a queue structure of the message queue engine. The network connection manager may transmit the notification to processors on another network controller for transit packets.

As further shown in FIG. 5, the network controller 502 may include a network DMA. In an egress (e.g., transmit) direction, the network DMA may read data from a memory system (e.g., from the memory block) and pass the data to a network transmit engine (NTE). In a regress (e.g., receive) direction, the network DMA can transfer data from the network receive engine (NRE) to a memory system. The network connection manager may provide the packet descriptors to the network DMA for ingress and egress directions.

As shown in FIG. 5, the network controller 502 may include a network transmit engine (NTE). The NTE may receive a transmit command capsule (TCC) from the NCM for every transmitted network packet. For data packets or transit packets or control packets, the network DMA can pass data bytes to the NTE. For control packets (e.g., acknowledge and credit return packets), the network DMA may not pass any data bytes. In one or more embodiments, the NTE prepares a header stack and prepares an ethernet packet without CRC. The NTE ma include an encryption engine (EDU). The NTE may write data to a network interface buffer (NIB).

In one or more embodiments, the network controller 502 includes a network receive engine (NRE). The NRE may receive the packet from the NIB and pass the data through a decryption engine. In one or more embodiments, the NRE includes a buffer to store the complete packet. The NRE may create a receive command capsule (RCC) and communicate the RCC to the NCM. The NCM may perform a connection lookup and prepare a receive decision capsule (RDC) to be sent to the NRE. Based on the information in the RDC, the NRE can drop the packet byte, append a new header to the incoming bytes, or remote bytes from the packet header and the packet tail.

As noted above, the network controller 502 may include a network interface buffer (NIB). In an egress direction, the NIB may store the packet received from the NTE, put the packet header in appropriate queues, and transmit the packet to the MAC. In an egress direction, the NIB may determine the traffic class of the incoming packet and store the packet in an ingress buffer. In one or more embodiments, the MB stores the packet point in packet descriptor queues and arbitrates based on priority to send the packet to the NRE. If the ingress packet queues are more than a programmed threshold, PFC may be asserted to the MAC.

Figure 6:
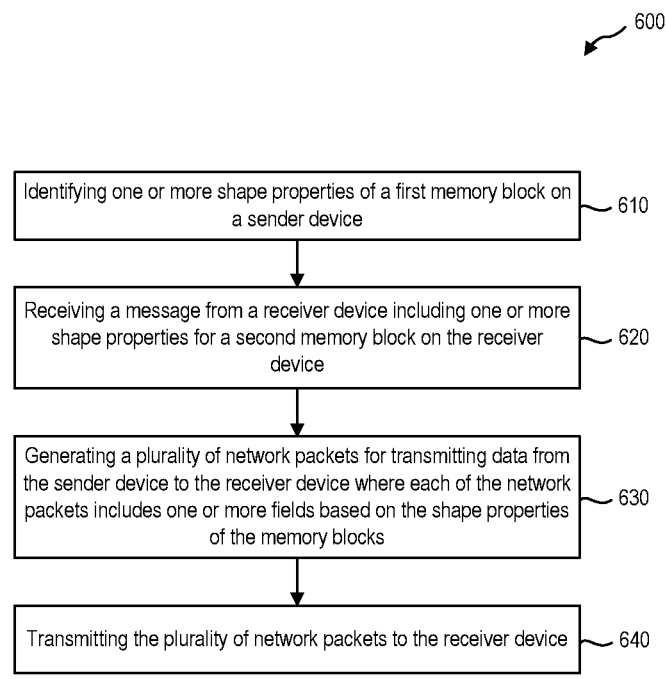
FIG. 6 illustrates an example series of acts for transmitting data from a sender device to a receiver device in accordance with one or more embodiments.

Turning now to FIG. 6, this figure illustrates example flowcharts including series of acts for generating and transmitting data between memory blocks of disparate shapes. While FIG. 6 illustrates acts according to one or more embodiments, alternative embodiments may omit, add to, reorder, and/or modify any of the acts shown in FIG. 6. The acts of FIG. 6 can be performed as part of a method. Alternatively, a non-transitory computer-readable medium can include instructions that, when executed by one or more processors, cause a computing device (e.g., a server device) to perform the acts of FIG. 6. In still further embodiments, a system can perform the acts of FIG. 6.

FIG. 6 illustrates a series of acts 600 related to transmitting network packets between devices having different sized and/or shaped memory blocks. As shown in FIG. 6, the series of acts 600 includes an act 610 of identifying one or more shape properties of a first memory block on a sender device. For example, the act 610 may involve identifying a first set of data characteristics for data on a first multi-dimensional memory block on a sender device where the data characteristics include one or more shape properties for the first multi-dimensional memory block. In one or more embodiments, a first shape of the first multi-dimensional memory block has different dimensions than a second shape of the second multi-dimensional memory block. In one or more embodiments, the first memory block includes data stored in a two-dimensional shape within memory hardware on the sender device. In one or more embodiments, the first memory block includes data stored in a three-dimensional shape within memory hardware on the sender device.

As further shown in FIG. 6, the series of acts 600 includes an act 620 of receiving a message from a receiver device including one or more shape properties for a second memory block on the receiver device. For example, in one or more embodiments, the act 620 involves receiving a message from a receiver device including one or more shape properties for a second multi-dimensional memory block on the receiver device.

As further shown in FIG. 6, the series of acts 600 includes an act 630 of generating a plurality of network packets for transmitting data from the sender device to the receiver device where each of the network packets includes one or more fields based on the shape properties of the memory blocks. For example, in one or more embodiments, the act 630 may involve generating a plurality of network packets for transmitting data from the sender device to the receiver device where each network packet from the plurality of network packets includes one or more header fields on the one or more shape properties for the first memory block and the one or more shape properties for the second memory block.

As further shown in FIG. 6, the series of acts 600 includes an act 640 of transmitting the plurality of network packets to the receiver device. For example, in one or more embodiments, the act 640 may involve providing the plurality of network packets to the receiver device for writing data from to the second memory block.

In one or more embodiments, the series of acts 600 includes generating a semaphore message confirming transmission of the plurality of network packets and providing the semaphore message to a processor on the sender device. In one or more embodiments, a semaphore message is also generated and provided to a processor on the receiver device.

In one or more embodiments, the plurality of network packets include a first set of network packets having a fixed segment size and a last network packet having a same or smaller size than the fixed segment size. In one or more embodiments, the fixed segment size is based on one or more hardware specifications of network controllers on the sender device and the receiver device. Further, in one or more embodiments, the one or more header fields from each network packet includes a first base address associated with a base memory address on the first memory block and an offset value indicative of an order of a given packet within the plurality of network packets, the order of the given packet representing a number of bytes from the first base address.

In one or more embodiments, the plurality of network packets are provided from a first network controller of the sender device to a second network controller of the receiver device via one or more configurations of connections between the first network controller and the second network controller. For example, in one or more embodiments, the network packets are provided via direct ethernet wire connecting the first network controller and the second network controller. In one or more embodiments, the network packets are provided via a series of ethernet switches and routers.

In one or more embodiments, the plurality of network packets includes a first message block having a first set of network packets and a first remote semaphore message indicating an end of the first message block. The plurality of network packets may further include a second message block having a second set of network packets and a second remote semaphore message indicating an end of the second message block. In one or more embodiments, providing the plurality of network packets includes providing both the first message block and the second message block without waiting for confirmation of receipt of one or more data packets from the first message block/

Figure 7:
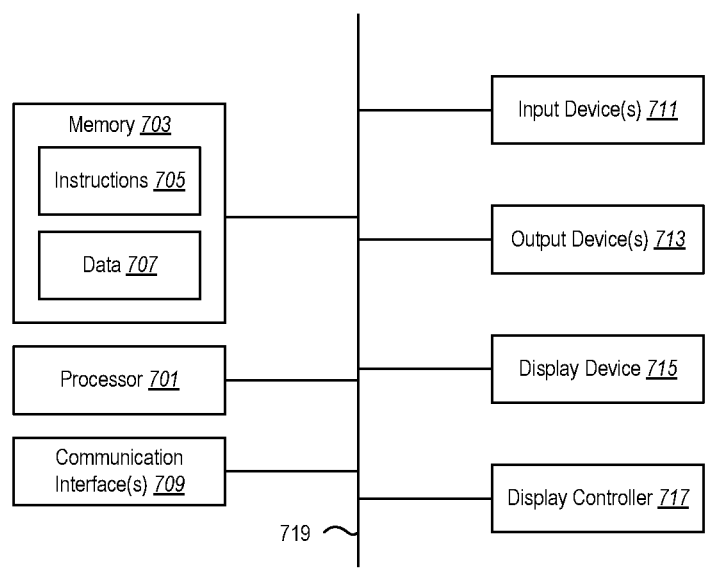
FIG. 7 illustrates certain components that may be included within a computer system.

FIG. 7 illustrates certain components that may be included within a computer system 700. One or more computer systems 700 may be used to implement the various devices, components, and systems described herein.

The computer system 700 includes a processor 701. The processor 701 may be a general-purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 701 may be referred to as a central processing unit (CPU). Although just a single processor 701 is shown in the computer system 700 of FIG. 7, in an alternative configuration, a combination of processors (e.g., an ARM and DSP) could be used.

The computer system 700 also includes memory 703 in electronic communication with the processor 701. The memory 703 may be any electronic component capable of storing electronic information. For example, the memory 703 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 705 and data 707 may be stored in the memory 703. The instructions 705 may be executable by the processor 701 to implement some or all of the functionality disclosed herein. Executing the instructions 705 may involve the use of the data 707 that is stored in the memory 703. Any of the various examples of modules and components described herein may be implemented, partially or wholly, as instructions 705 stored in memory 703 and executed by the processor 701. Any of the various examples of data described herein may be among the data 707 that is stored in memory 703 and used during execution of the instructions 705 by the processor 701.

A computer system 700 may also include one or more communication interfaces 709 for communicating with other electronic devices. The communication interface(s) 709 may be based on wired communication technology, wireless communication technology, or both. Some examples of communication interfaces 709 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 700 may also include one or more input devices 711 and one or more output devices 713. Some examples of input devices 711 include a keyboard, mouse, microphone, remote control device, button, joystick, trackball, touchpad, and lightpen. Some examples of output devices 713 include a speaker and a printer. One specific type of output device that is typically included in a computer system 700 is a display device 715. Display devices 715 used with embodiments disclosed herein may utilize any suitable image projection technology, such as liquid crystal display (LCD), light-emitting diode (LED), gas plasma, electroluminescence, or the like. A display controller 717 may also be provided, for converting data 707 stored in the memory 703 into text, graphics, and/or moving images (as appropriate) shown on the display device 715.

The various components of the computer system 700 may be coupled together by one or more buses, which may include a power bus, a control signal bus, a status signal bus, a data bus, etc. For the sake of clarity, the various buses are illustrated in FIG. 7 as a bus system 719.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

As used herein, non-transitory computer-readable storage media (devices) may include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method, comprising:
identifying, with a first network controller of a sender device, a first set of data characteristics for data on a first multi-dimensional memory block of the sender device, the first set of data characteristics including shape properties of the first multi-dimensional memory block, the shape properties of the first multi-dimensional memory block including array dimensions of hardware of the first multi-dimensional memory block;
receiving, with the first network controller, a receive message notification from a second network controller of a receiver device, the receive message notification including shape properties of a second multi-dimensional memory block of the receiver device, the shape properties of the second multi-dimensional memory block including array dimensions of hardware of the second multi-dimensional memory block;
generating, at the sender device, a message for transmitting the data on the first multi-dimensional memory block to the receiver device, wherein generating the message includes, based on a size of the message exceeding a threshold block size, generating, with the first network controller, multiple message blocks, each message block including a plurality of network packets for transmitting the data from the first network controller of the sender device to the first network controller of the receiver device, wherein each network packet from the plurality of network packets includes a plurality of header fields indicating the shape properties of the first multi-dimensional memory block and the shape properties of the second multi-dimensional memory block; and
providing the plurality of network packets to the receiver device for writing data to the second memory block.

2. The method of claim 1, wherein the array dimensions of hardware of the first multi-dimensional memory block have different dimensions than the array dimensions of hardware of the second multi-dimensional memory block.

3. The method of claim 1, further comprising generating a semaphore message confirming transmission of the plurality of network packets and providing the semaphore message to a processor on the sender device.

4. The method of claim 1, wherein the plurality of network packets includes a first set of network packets having a fixed segment size and a last network packet having a same or smaller size than the fixed segment size, wherein the fixed segment size is based on one or more hardware specifications of network controllers on the sender device and the receiver device.

5. The method of claim 4, wherein the offset value indicates an order of a given packet within the plurality of network packets, the order of the given packet representing a number of bytes from the first base address.

6. The method of claim 1, wherein the plurality of network packets are provided from the first network controller of the sender device to the second network controller of the receiver device via one or more of:

a direct ethernet wire connecting the first network controller and the second network controller; or
a series of ethernet switches and routers.

7. The method of claim 1, wherein the first multi-dimensional memory block includes data stored in one or more of:
a two-dimensional shape within memory hardware on the sender device; or
a three-dimensional shape within memory hardware on the sender device.

8. The method of claim 1, wherein the plurality of network packets includes:
a first message block including a first set of network packets and a first remote semaphore message indicating an end of the first message block; and
a second message block including a second set of network packets and a second remote semaphore message indicating an end of the second message block.

9. The method of claim 8, wherein providing the plurality of network packets includes providing both the first message block and the second message block without waiting for confirmation of receipt of one or more data packets.

10. The method of claim 1, wherein the plurality of network packets are received asynchronously at the receiver device, wherein data is written to the second memory block based on information contained within the plurality of header fields of the plurality of network packets independent of an order in which the plurality of network packets are received at the receiver device.

11. The method of claim 1, wherein the array dimensions of hardware of the first multi-dimensional memory block have two dimensions and the array dimensions of hardware of the second multi-dimensional memory block have three dimensions.

12. A system, comprising:
one or more processors;
memory in electronic communication with the one or more processors; and
instructions stored in the memory, the instructions being executable by the one or more processors to:
identify, with a first network controller of a sender device, a first set of data characteristics for data on a first multi-dimensional memory block of the sender device, the first set of data characteristics including shape properties of the first multi-dimensional memory block, the shape properties of the first multi-dimensional memory block including array dimensions of hardware of the first multi-dimensional memory block;
receive, with the first network controller, a receive message notification from a second network controller of a receiver device, the receive message notification including shape properties for a second multi-dimensional memory block on the receiver device, the shape properties of the second multi-dimensional memory block including array dimensions of hardware of the second multi-dimensional memory block;
generate, at the sender device, a message for transmitting the data on the first multi-dimensional memory block to the receiver device, wherein generating the message includes, based on a size of the message exceeding a threshold block size, generating, with the first network controller, multiple message blocks, each message block including a plurality of network packets for transmitting the data from the first network controller of the sender device to the first network controller of the receiver device, wherein each network packet from the plurality of network packets includes a plurality of header fields indicating the shape properties of the first multi-dimensional memory block and the shape properties of the second multi-dimensional memory block; and provide the plurality of network packets to the receiver device for writing data to the second multi-dimensional memory block.

13. The system of claim 12, wherein the array dimensions of hardware of the first multi-dimensional memory block have different dimensions than the array dimensions of hardware of the second multi-dimensional memory block.

14. The system of claim 12, wherein the plurality of network packets includes a first set of network packets having a fixed segment size and a last network packet having a same or smaller size than the fixed segment size, wherein the fixed segment size is based on one or more hardware specifications of network controllers on the sender device and the receiver device.

15. The system of claim 14, wherein the offset value indicates an order of a given packet within the plurality of network packets, the order of the given packet representing a number of bytes from the first base address.

16. The system of claim 12, wherein the first multi-dimensional memory block includes data stored in one or more of a two-dimensional shape or a three-dimensional shape within memory hardware on the sender device.

17. The system of claim 12, wherein the plurality of network packets includes:
a first message block including a first set of network packets and a first remote semaphore message indicating an end of the first message block; and
a second message block including a second set of network packets and a second remote semaphore message indicating an end of the second message block,
wherein providing the plurality of network packets includes providing both the first message block and the second message block without waiting for confirmation of receipt of one or more data packets.

18. The system of claim 12, wherein the plurality of network packets are received asynchronously at the receiver device, wherein data is written to the second memory block based on information contained within the plurality of header fields of the plurality of network packets independent of an order in which the plurality of network packets are received at the receiver device.

19. A non-transitory computer readable medium storing instructions thereon that, when executed by one or more processors, causes a computing device to:
identify, with a first network controller of a sender device, a first set of data characteristics for data on a first multi-dimensional memory block of the sender device, the first set of data characteristics including shape properties of the first multi-dimensional memory block, the shape properties of the first multi-dimensional memory block including array dimensions of hardware of the first multi-dimensional memory block;
receive, with the first network controller, a receive message notification from a second network controller of a receiver device, the receive message notification including shape properties for a second multi-dimensional memory block of the receiver device, the shape properties of the second multi-dimensional memory block including array dimensions of hardware of the second multi-dimensional memory block;
generate, at the sender device, a message for transmitting the data on the first multi-dimensional memory block to the receiver device, wherein generating the message includes, based on a size of the message exceeding a threshold block size, generating, with the first network controller, multiple message blocks, each message block including a plurality of network packets for transmitting the data from the first network controller of the sender device to the second network controller of the receiver device, wherein each network packet from the plurality of network packets includes a plurality of header fields indicating the shape properties of the first multi-dimensional memory block and the shape properties of the second multi-dimensional memory block; and
provide the plurality of network packets to the receiver device for writing data to the second multi-dimensional memory block.

20. The non-transitory computer readable medium of claim 19, wherein the array dimensions of hardware of the first multi-dimensional memory block have different dimensions than the array dimensions of hardware of the second multi-dimensional memory block, and wherein the first multi-dimensional memory block includes data stored in one or more of a two-dimensional shape or a three-dimensional shape within memory hardware on the sender device.

* * * * *